Aug. 1, 1961  K. P. RYAN  2,994,388
FARM IMPLEMENT
Filed March 24, 1958  2 Sheets-Sheet 1
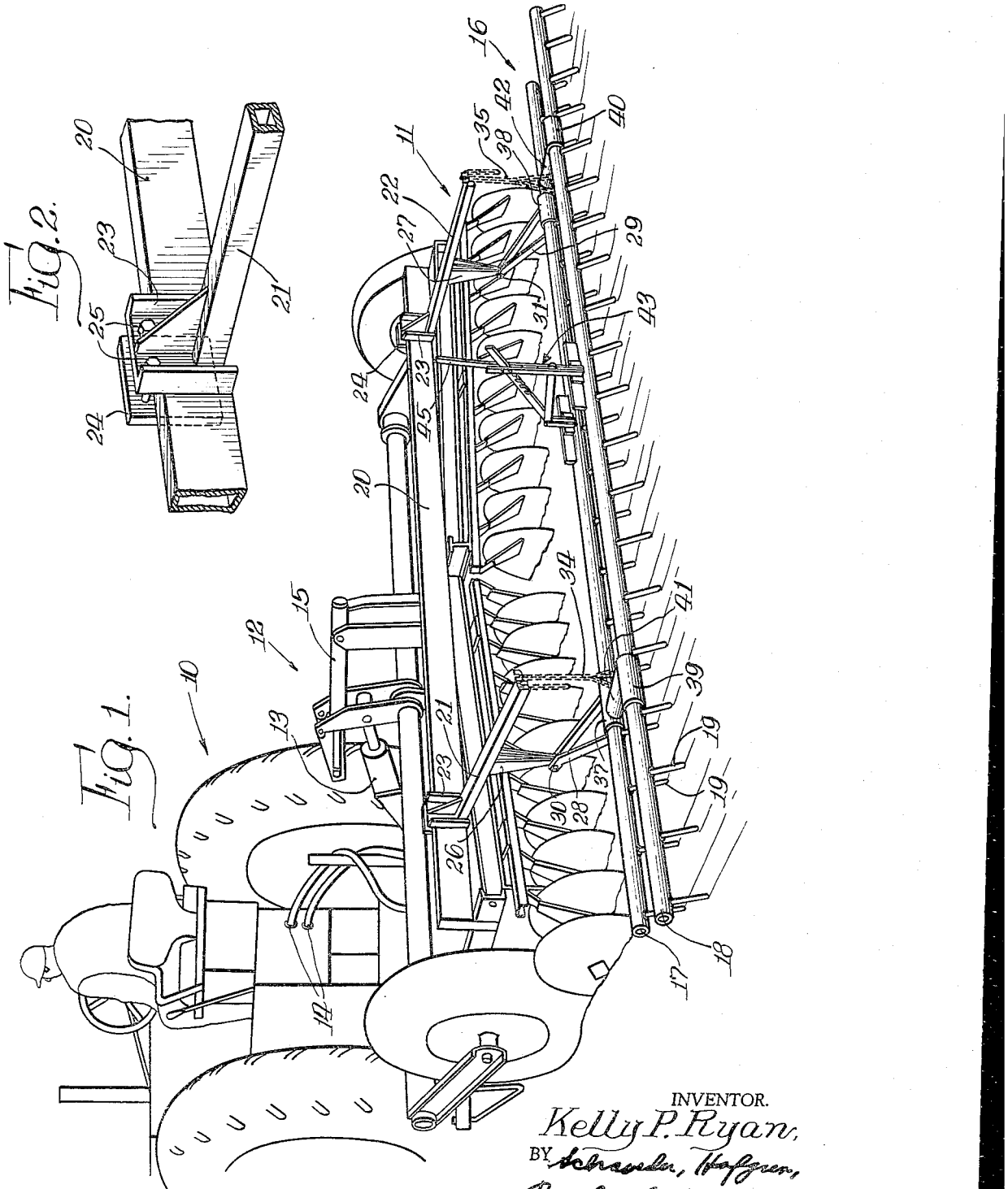
INVENTOR.
Kelly P. Ryan
BY Schroeder, Hofgren,
Brady & Wagner
Attys.

Aug. 1, 1961 K. P. RYAN 2,994,388
FARM IMPLEMENT
Filed March 24, 1958 2 Sheets-Sheet 2
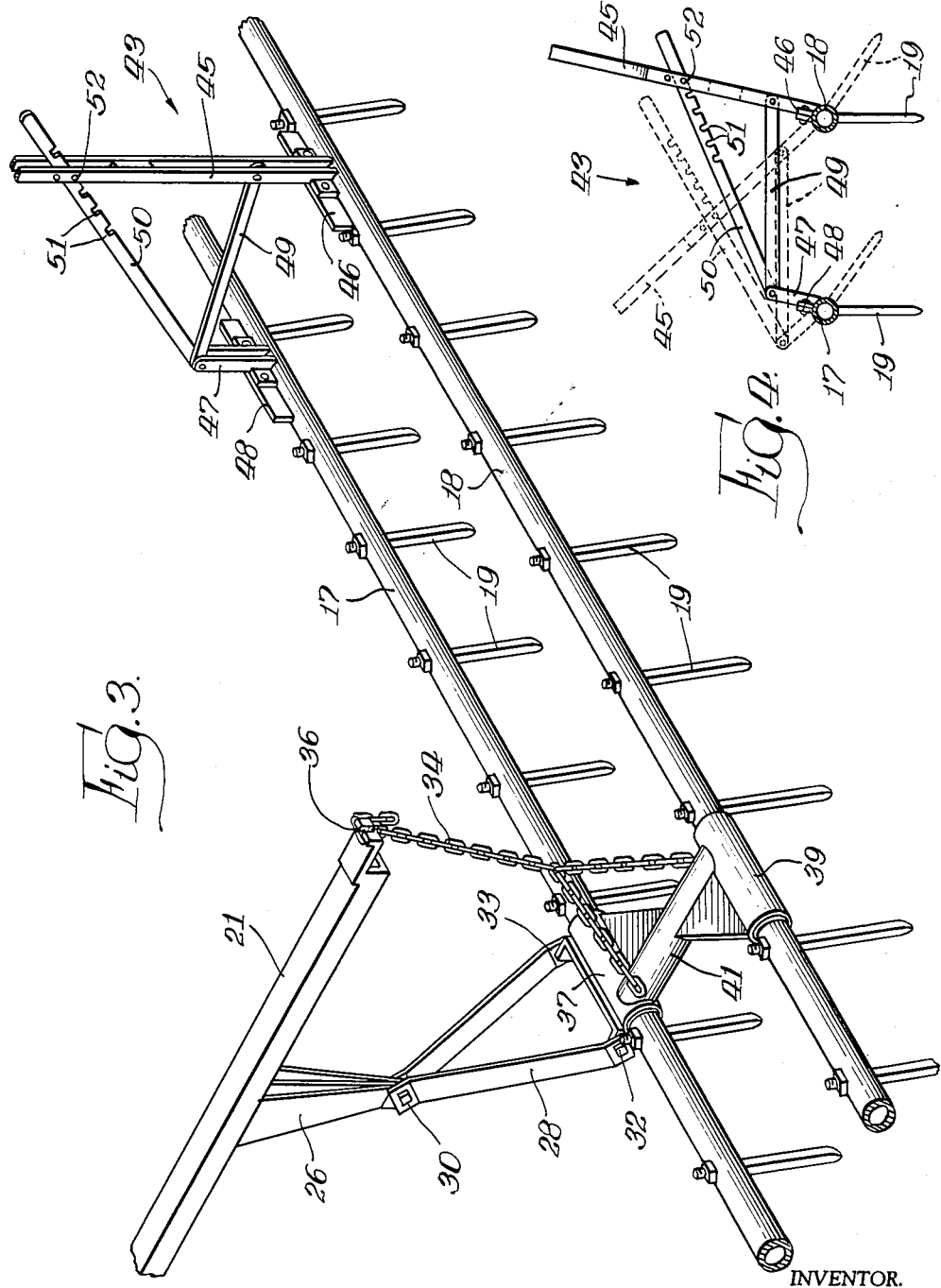
INVENTOR.
Kelly P. Ryan
BY Schroeder, Hofgren,
Brady & Wegner
Atty's

United States Patent Office 2,994,388
Patented Aug. 1, 1961

2,994,388
FARM IMPLEMENT
Kelly P. Ryan, Blair, Nebr., assignor to Blair Manufacturing Co., Inc., a corporation of Nebraska
Filed Mar. 24, 1958, Ser. No. 723,571
1 Claim. (Cl. 172—635)

This invention relates to a farm implement and more particularly to a farm implement such as a harrow or the like.

It is the general object of the present invention to produce a new and improved farm implement of the character described.

It is a further object of the present invention to produce a farm implement in the form of a harrow which is provided with means for readily securing it to another farm implement to be pulled by a tractor so that two soil treating operations can be performed by the farmer substantially simultaneously.

In many farming operations where soil is being worked upon, several operations are necessary to provide a proper seed bed. Thus, normally a field may be plowed, disced, and finally harrowed. Normally, the discing and harrowing operations must be carried on successively rather than simultaneously because there has been no mounting available which would permit maneuverability of the implements if a disc and harrow were pulled in tandem. Such an arrangement creates problems for the farmer when road transport of the implements to a field is required and difficulty may even be encountered in turning sharply if a disc and harrow are merely pulled in tandem.

Most farm tractors are presently equipped with hydraulic or other means for raising the farm implement attached to the draw bar of the tractor and if such an implement be a disc harrow, it can be lifted and transported by the tractor down a road to the field which is to be disced and such elevation of the disc also aids in making sharp turns while discing a field.

According to this invention, however, there is provided a spike tooth harrow which can readily be attached to a disc or other farm implement by a mounting means which enables the tractor operator to lift both the disc and harrow simultaneously for road transport or turning, thus giving him not only the advantage of performing two operations in one (discing and harrowing), but also retains all the advantages which flow from being able to raise a draw bar attached implement.

Other and further objects and advantages of the invention will be readily apparent from the following description and drawings, in which:

FIG. 1 is a rear elevational view of a farm implement embodying the invention;

FIG. 2 is an enlarged detailed view of the support by which the implement of the present invention is supported;

FIG. 3 is an enlarged view of the harrow of the present invention showing details of construction; and FIG. 4 is a view of the adjusting device for adjusting the angle of the harrow teeth.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claim.

As previously indicated, the apparatus of the present invention is particularly adapted to be used in combination with another farm implement attached to a tractor so that two ground treating operations may be performed simultaneously. Thus, as shown in the drawings, a tractor 10 has secured to its draw bar a disc harrow or discer 11 so that a discing operation may be performed as the implement is drawn across a field. Forming a part of the tractor is an implement raising device 12 which includes among its parts a hydraulic piston and cylinder device 13 provided with fluid under pressure through lines 14 and connected to a linkage 15, in turn connected to the discer 11 for raising the discer out of contact with the ground so that the same may be transported from field to field or so that sharp turns can be made.

Attached to the discer 11 is a toothed harrow 16 arranged so as to be drawn behind the discer and connected thereto so as to be raised and lowered at the same time and by the same apparatus as utilized in raising and lowering the discer. The harrow 16 includes a pair of parallel bars 17 and 18, each carrying a plurality of teeth 19 arranged to engage the ground so as to further pulverize the soil worked upon by the discer.

Extending across the top of the discer is a support 20 in the form of a box beam to which is rigidly secured a pair of arms 21 and 22. The arms are attached to the support by means of a bracket 23 on the arm which is positioned on one side of the support 20 opposite a plate 24 located on the other side of the support, there being provided bolts 25 extending through the bracket and plate to clamp the arms on the support.

Each of the arms 21 and 22 is provided with a downwardly extending leg 26 and 27. At the lower portion of each of the legs there are mounted rigid forked members 28 and 29, the forked members being swingably mounted on the legs by reason of a pivotal connection thereto indicated at 30 and 31.

The opposite ends of each of the forked members are pivotally connected at 32 and 33 to the bar 17. Stop members in the form of chains 34 and 35 are provided, the chains being adjustably connected to the outer ends of each of the arms 21 and 22 by engagement with a slot 36 provided in the arms.

The bars 17 and 18 are rotatably secured together by means of collars 37 and 38 on the front bar, connected to collars 39 and 40 on the rear bar by means of the tubular members 41 and 42. While each of the bars may rotate in the collars just described, they are held against rotation and in a predetermined and adjustable angular relationship to the ground by means of the adjusting device 43. This device includes a lever 45 secured to the rear bar 18 through the medium of a bracket 46 together with a second lever 47 secured to the front bar 17 through the medium of a second bracket 48. A link 49 is pivotally connected to each of the levers while an adjusting bar 50 is pivotally connected to the front lever 47 and is provided with a plurality of notches 51 engageable with pins 52 mounted in the bifurcated lever 45.

As clearly illustrated in FIG. 4, engagement of the various notches 51 with the pin 52 simultaneously rotates the bars 17 and 18 and thereby adjusts the angle of the teeth 19.

Inasmuch as the support 20 and arms 21 are rigidly secured across the top of the discer 11, the chains 34 and 35 which are connected to the arms limit the downward movement of the toothed harrow 16. By adjustment of the chains, the degree of ground contact may be varied. When the discer is raised by means of the raising device 12, the chains serve to lift the harrow simultaneously with the discer while the swinging mounting provided by the forked members 28 and 29 not only allows the harrow 16 to accommodate itself to any irregularities in the terrain, but also facilitates the raising and lowering of the apparatus in the manner hereinbefore described.

I claim:

A harrow adapted for use with a tractor having a device for raising an implement attached to the draw bar of the tractor comprising a support to be mounted on and extend transversely across the implement, a pair of arms rigidly attached to the support and extending rearwardly over and beyond the implement, a downwardly depending leg on each support, a pair of tooth carrying bars rotatably secured together in spaced parallel relationship transverse to the direction of travel of the tractor, a pair of rigid forked members each pivotally secured at its apex to the lower portion of a leg and pivotally secured at its opposite end to one of the bars, a pair of chains each adjustably secured at one end to an arm and secured at its other end to the bars, and adjustable means for maintaining the bars in predetermined rotational relationship to each other to determine the angle to the vertical of the teeth on the bars.

References Cited in the file of this patent

UNITED STATES PATENTS

| Number | Name | Date |
|---|---|---|
| 126,815 | Kleffel | May 14, 1872 |
| 272,454 | Mighell | Feb. 20, 1883 |
| 847,404 | Foote | Mar. 19, 1907 |
| 876,748 | Tobin | Jan. 14, 1908 |
| 1,626,572 | Wiese | Apr. 26, 1927 |
| 2,336,152 | Rude | Dec. 7, 1943 |
| 2,591,028 | Udy | Apr. 1, 1952 |
| 2,690,110 | Crouch | Sept. 28, 1954 |
| 2,736,252 | Latshaw | Feb. 28, 1956 |
| 2,751,834 | Hines et al. | June 26, 1956 |
| 2,800,758 | Schmied | July 30, 1957 |